(12) United States Patent
Chang et al.

(10) Patent No.: US 10,803,833 B1
(45) Date of Patent: Oct. 13, 2020

(54) DISPLAY SYSTEMS AND INTEGRATED SOURCE DRIVER CIRCUITS

(71) Applicant: HIMAX TECHNOLOGIES LIMITED, Tainan (TW)

(72) Inventors: Wei-Jen Chang, Tainan (TW); Kuo-Tung Hsu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/695,081

(22) Filed: Nov. 25, 2019

(51) Int. Cl.
*G09G 5/12* (2006.01)
*G09G 5/00* (2006.01)

(52) U.S. Cl.
CPC ............. *G09G 5/12* (2013.01); *G09G 5/006* (2013.01); *G09G 2310/0275* (2013.01); *G09G 2310/08* (2013.01)

(58) Field of Classification Search
CPC .. G09G 5/12; G09G 5/006; G09G 2310/0275; G09G 2310/08; G09G 2310/0286; G09G 2300/023; G09G 2300/026; G09G 3/3688; G09G 3/3611; G06F 3/1446
See application file for complete search history.

(56) References Cited

U.S. PATENT DOCUMENTS

| | | | | |
|---|---|---|---|---|
| 5,465,101 A * | 11/1995 | Akiba | ............ | H04N 9/12 345/1.3 |
| 5,563,624 A * | 10/1996 | Imamura | ............ | G06F 3/147 345/100 |
| 2001/0002124 A1 * | 5/2001 | Mamiya | ............ | G09G 5/005 345/418 |
| 2010/0128020 A1 * | 5/2010 | Oh | ............ | G06F 3/1446 345/213 |
| 2012/0120048 A1 * | 5/2012 | Nishimoto | ............ | G09G 3/20 345/212 |
| 2013/0100181 A1 * | 4/2013 | Choe | ............ | G09G 3/3614 345/691 |
| 2013/0207944 A1 * | 8/2013 | Oohira | ............ | G09G 3/3685 345/204 |
| 2013/0222441 A1 * | 8/2013 | Yokoyama | ............ | G06F 3/1438 345/690 |
| 2013/0314552 A1 * | 11/2013 | Miaw | ............ | H04N 9/3147 348/189 |

(Continued)

*Primary Examiner* — Tom V Sheng
(74) *Attorney, Agent, or Firm* — Winston Hsu

(57) ABSTRACT

A display system includes first and second systems. First system includes first panel, first set of gate driver circuits, and first set of integrated source driver circuits, Second system includes second panel, second set of gate driver circuits, and second set of integrated source driver circuits. First set of integrated source driver circuits are cascaded-connected; the second set of integrated source driver circuits are cascaded-connected; a last one in the first set of integrated source driver circuits is coupled to a first one of the second set of integrated source driver circuits via an auxiliary communication port based on an auxiliary communication protocol; an auxiliary communication signal having frame start, frame resolution information of first system, and a system enable bit of first system is transmitted to second system via auxiliary communication port to synchronize image display operation of first system with image display operation of second system.

12 Claims, 7 Drawing Sheets

(56) References Cited

U.S. PATENT DOCUMENTS

| | | | |
|---|---|---|---|
| 2015/0138038 A1* | 5/2015 | Nam | G06F 3/1446 345/1.3 |
| 2015/0228228 A1* | 8/2015 | Han | G09G 3/005 345/690 |
| 2016/0086568 A1* | 3/2016 | Imamura | G06F 1/1684 345/643 |
| 2016/0155395 A1* | 6/2016 | Park | G09G 3/3611 345/100 |
| 2016/0275835 A1* | 9/2016 | Yuan | G09F 9/35 |
| 2016/0275908 A1* | 9/2016 | Kim | G06F 3/1423 |
| 2017/0186365 A1* | 6/2017 | Yoneda | H04N 19/513 |
| 2018/0035018 A1* | 2/2018 | Yamada | G09G 5/006 |
| 2019/0371271 A1* | 12/2019 | Morris | G06F 3/1438 |

\* cited by examiner

DISPLAY SYSTEMS AND INTEGRATED SOURCE DRIVER CIRCUITS

BACKGROUND OF THE INVENTION

1. Field of the Invention

The invention relates to a display scheme, and more particularly to display systems and source driver circuits.

2. Description of the Prior Art

Generally speaking, a display system such as a display system employed in an automotive system/product may comprise multiple sub-systems which are used for displaying different images on different panels which may be distinct and may be portions of the same panel. A conventional scheme may cascade multiple source drivers in each sub-system to generate multiple source drive signals to different regions of a panel respectively if the panel is designed with high frame resolution such as 1920*2160. In a sub-system, the cascaded source drivers may be able to communicate with adjacent ones so that the image display for the different regions of a panel of such sub-system can be synchronized. However, the conventional scheme fails to synchronize the image display operations of different sub-systems. Thus, the number of sub-systems cannot be horizontally scalable.

SUMMARY OF THE INVENTION

Therefore one of the objectives of the invention is to provide display systems and corresponding source driver circuits, to solve the above-mentioned problems.

According to one embodiment, a display system is disclosed. The display system comprises a first system and a second system. The first system comprises a first panel, a first set of gate driver circuits coupled to the first panel, and a first set of integrated source driver circuits which are coupled to the first panel and the first set of gate driver circuits. The second system comprises a second panel, a second set of gate driver circuits coupled to the second panel, and a second set of integrated source driver circuits which are coupled to the second panel and the second set of gate driver circuits. The first set of integrated source driver circuits are cascaded-connected; the second set of integrated source driver circuits are cascaded-connected; a last one in the first set of integrated source driver circuits is coupled to a first one of the second set of integrated source driver circuits via an auxiliary communication port based on an auxiliary communication protocol; an auxiliary communication signal which comprises a frame start, frame resolution information of the first system, and a system enable bit of the first system is transmitted to the second system via the auxiliary communication port to synchronize an image display operation of the first system with an image display operation of the second system.

According to one embodiment, the above-mentioned integrated source driver circuit is disclosed.

According to one embodiment, a display system is disclosed. The display system comprises a first system and a second system. The first system comprises a first panel, a first set of gate driver circuits coupled to the first panel, a first set of source driver circuits coupled to the first panel, and a first timing controller coupled the first set of gate driver circuits and the first set of source driver circuits and used for controlling the first set of gate driver circuits and the first set of source driver circuits. The second system comprises a second panel, a second set of gate driver circuits coupled to the second panel, a second set of source driver circuits coupled to the second panel, and a second timing controller coupled the second set of gate driver circuits and the second set of source driver circuits and used for controlling the second set of gate driver circuits and the second set of source driver circuits. The first set of source driver circuits are cascaded-connected; the second set of source driver circuits are cascaded-connected; a last one in the first set of source driver circuits is coupled to a first one of the second set of source driver circuits via an auxiliary communication port based on an auxiliary communication protocol; an auxiliary communication signal which comprises frame resolution information of the first system and a system enable bit of the first system is transmitted to the second system via the auxiliary communication port to synchronize an image display operation of the first system with an image display operation of the second system.

According to one embodiment, a display system is further disclosed. The display system comprises a first system and a second system. The first system comprises a first panel, a first set of gate driver circuits coupled to the first panel, a first set of source driver circuits coupled to the first panel, and a first timing controller coupled the first set of gate driver circuits and the first set of source driver circuits and used for controlling the first set of gate driver circuits and the first set of source driver circuits. The second system comprises a second panel, a second set of gate driver circuits coupled to the second panel, a second set of source driver circuits coupled to the second panel, and a second timing controller coupled the second set of gate driver circuits and the second set of source driver circuits and used for controlling the second set of gate driver circuits and the second set of source driver circuits. The first set of source driver circuits are cascaded-connected; the second set of source driver circuits are cascaded-connected; a last one in the first set of source driver circuits is coupled to a first one of the second set of source driver circuits via an auxiliary communication port based on an auxiliary communication protocol which is used to send an auxiliary communication signal comprising a frame start to synchronize an image display operation of the first system with an image display operation of the second system. A first master integrated source driver circuit in the first set of integrated source driver circuits and a second master integrated source driver circuit in the second set of integrated source driver circuits are arranged to generate a first scan driver start pulse signal and a second scan driver start pulse signal respectively to the first set of gate driver circuits and the second set of gate driver circuits when the first master integrated source driver circuit and the second master integrated source driver circuit receive a specific horizontal synchronization signal after the frame start is received.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a display system solution with an auxiliary communication protocol which is capable of synchronizing image displays of multiple display sub-systems in a display system such as automotive display system (but not limited) so that the number of display sub-systems can be horizontally scalable as well as the image displays and corresponding dot polarity pattern for the whole display system are still correct.

Figure 1:
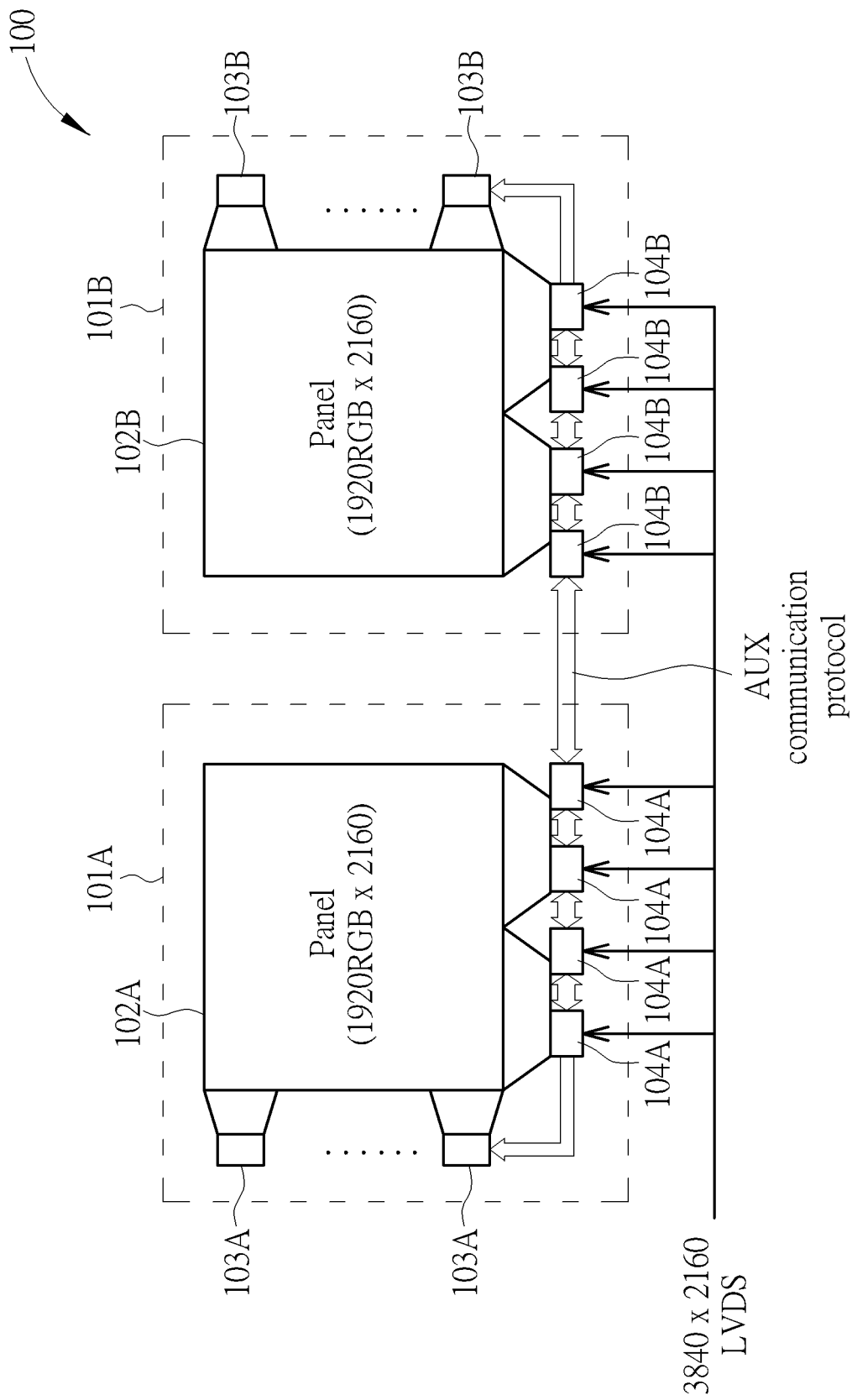
FIG. 1 is a block diagram of a display system 100 according to an embodiment of the invention.

FIG. 1 is a block diagram of a display system 100 according to an embodiment of the invention. The display system 100 comprises at least two systems 101A and 101B wherein the two systems 101A and 101B are display sub-systems and are shown on FIG. 1 (but the number of sub-systems is not intended to be a limitation). Each display sub-system comprises a panel, a set of gate driver circuits, and a set of integrated source driver circuits such as four cascaded integrated source driver circuits. For example, the first system. 101A comprises the first panel 102A, the first set of gate driver circuits 103A, and the first set of integrated source driver circuits 104A. The second system 101B comprises the second panel 102B, the second set of gate driver circuits 103B, and the second set of integrated source driver circuits 104B.

The resolution of panel 102A may be 1920RGB×2160, and the resolution of panel 102B may also be 1920RGB×2160. In other embodiments, the resolution of panel 102A may be different from that of panel 102B. In addition, for different applications of the system 100, the panels 102A and 102B may be two adjacent portions/regions of a same panel.

Each integrated source driver circuit 104A or 104B is arranged to receive a frame input signal such as LVDS image signal via the LVDS (low voltage differential signaling) interface wherein the input LVDS image signal may carry information of a vertical synchronization pulse signal, horizontal synchronization pulse signals, and image data signal (s). The resolution of image data carried by the LVDS signal may be 3840×2160; however, this is not intended to be a limitation of the invention. In addition, one integrated source driver circuit is coupled to an adjacent integrated source driver circuit via a transmission interface having multiple synchronization signals so that such integrated source driver circuit can communicate with the adjacent integrated source driver circuit as well as the signal/clock timings of the two circuits can be synchronized. Accordingly, for the same display sub-system, the signal/clock timings of integrated source driver circuits cascaded are synchronized.

In addition, for implementation, the first set of integrated source driver circuits 104A are cascaded-connected wherein the first one in the first set of integrated source driver circuits is used as a master while other integrated source driver circuits are slaves.

To synchronize image display operations of two different display sub-systems, the first set of integrated source driver circuits are connected to the second set of integrated source driver circuits via an auxiliary channel/communication port based on an auxiliary (AUX) communication protocol. In practice, the AUX communication port has a single one signal pin (but not limited). Information such as resolution and/or frame synchronization in the system 101A is transmitted via the AUX communication port to the system 101B, so that the image display operation of the system 101B can be synchronized with that of system 101A.

In addition, each integrated source driver circuit comprises a source driver and a timing controller (TCON). An integrated source driver circuit means a circuit integrating functions and operation of a pure source driver with functions and operation of a timing controller.

Figure 2:
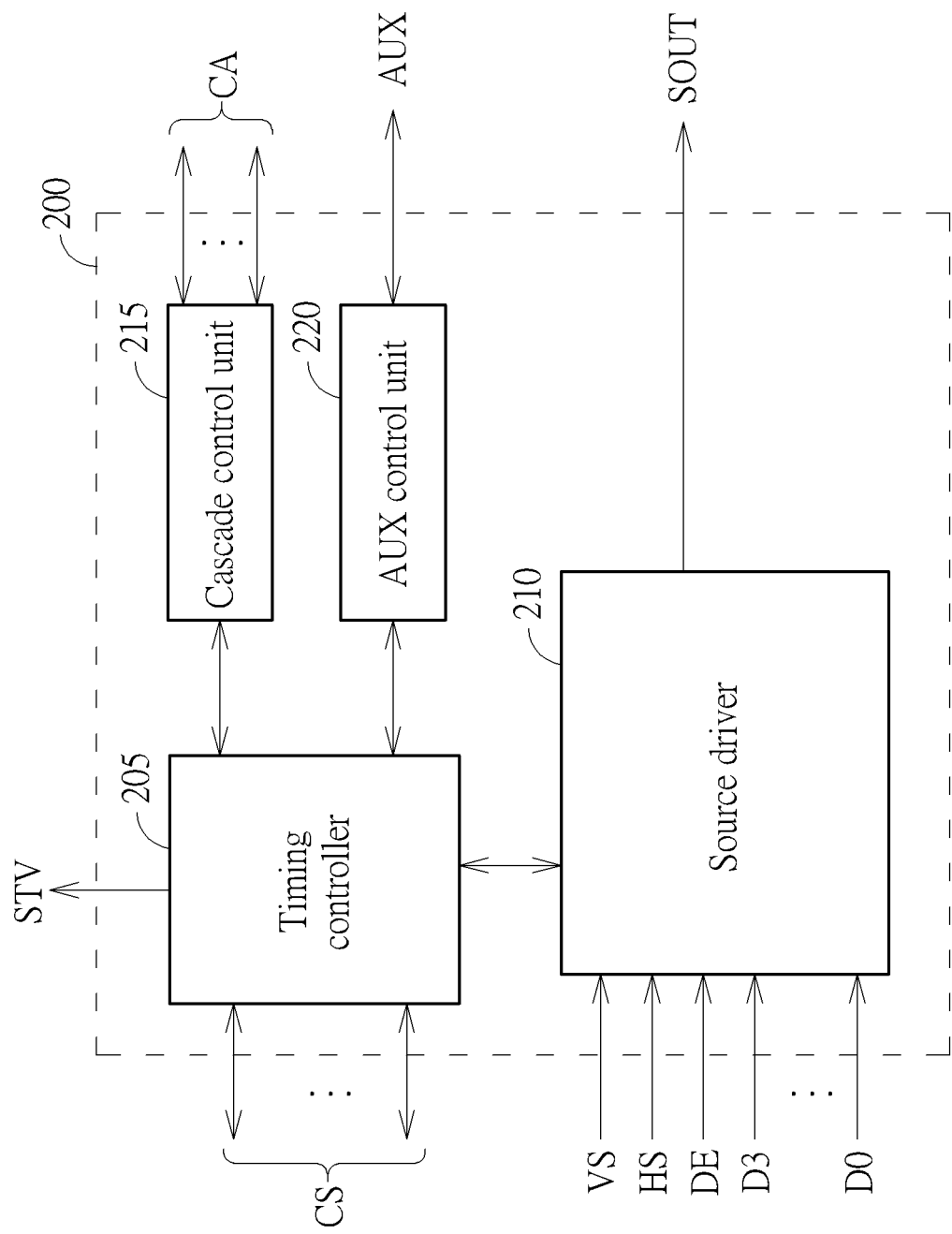
FIG. 2 is a simplified block diagram of an integrated source driver circuit according to an embodiment of the invention.

FIG. 2 is a simplified block diagram of an integrated source driver circuit 200 according to an embodiment of the invention. The integrated source driver circuit 200 comprises an input signal port, an output signal port, a control signal port, a cascade signal port, an auxiliary port, a timing controller 205, a source driver 210, a cascade control unit/circuit 215, and an AUX control unit/circuit 220. The timing controller 205 operates based on a set of control signals CS which is received via the control signal port and may be generated or determined by the user. The timing controller 205 is arranged to control the source driver 210 to receive the vertical sync signal VS, horizontal sync signal HS, date enable signal DE, and multiple image input signals D0, D1, D2, D3 to generate the image output signal SOUT to a panel. In addition, the timing controller 205 is also used to generates a driver start pulse signal STV to a corresponding gate driver circuit; this is described later. The vertical sync signal VS, horizontal sync signal HS, date enable signal DE, and multiple image input signals D0, D1, D2, D3 are received via the input signal port, and the image output signal SOUT is outputted via the output signal port. For example, the signal D3 may carry information of two bits, i.e. D3[0:1], and the signals D1, D2, D3 may respectively carry information of eight bits, i.e. D0[0:7], D1[0:7], and D2 [0:7]; however, this is not intended to be a limitation. In addition, the input interface of source driver 210 may support LVDS/TTL/RSDS interface and can support 24-bit (i.e. 8-bit RGB image) signal or 18-bit (i.e. 6-bit RGB image) signal. In addition, the output signal SOUT may carry information of 1440 bits (but not limited).

The timing controller 205 is used to obtain the vertical sync signal VS, horizontal sync signal HS from the source driver 210 to use the signals VS and HS to generate cascade control signals CA and to control the cascade control unit 215 to transmit the generated cascade control signals CA via the cascade signal port to a cascade control unit of a different integrated source driver circuit. In addition, the timing controller 205 can be used to obtain cascade control signals CA generated by a different integrated source driver circuit from the cascade control unit 215 via the cascade signal port wherein cascade control units 215 of integrated source driver circuits are used to communicate with a cascade control unit(s) 215 of integrated source driver circuit(s) at the next stage and/or at the previous stage. In addition, the timing controller 205 can control the AUX control unit 220 to generate and send an auxiliary communication signal AUX via the auxiliary port to the next system if the timing controller 205 is disposed at the last one of the set of integrated source driver circuits.

The auxiliary communication signal AUX is transmitted via the AUX communication port based on the AUX communication protocol. If the auxiliary communication signal AUX is transmitted from the system 101A to the system 101B, then the auxiliary communication signal AUX is used to carry specific information which comprises a frame start/synchronization, frame resolution information of the first system 101A, a system enable bit of the first system 101A, and a corresponding checksum. After receiving the auxiliary communication signal AUX from the system 101A, the set of integrated source driver circuits 104B can obtain the information of frame start and resolution of the system 101A, so that the set of integrated source driver circuits 104B can correctly calculate a position of a first dot in the image displayed by the second system 101B and its corresponding polarity. Alternatively, if the auxiliary communication signal AUX is transmitted from the system 101B to a third system, then the auxiliary communication signal AUX is used to carry specific information which comprises the frame start/synchronization, frame resolution information of the first system 101A, the system enable bit of the first system 101A, frame resolution information of the second system 101B, the system enable bit of the second system 101B, and a corresponding checksum. After receiving the auxiliary communication signal AUX from the system 101B, a different set of integrated source driver circuits disposed in the third system can obtain the information of frame start and resolution of the system 101A and the resolution information of system 101B, so that the different set of integrated source driver circuits disposed in the third system can correctly calculate a position of a first dot in the image displayed by the third system and its corresponding polarity.

Figure 3:
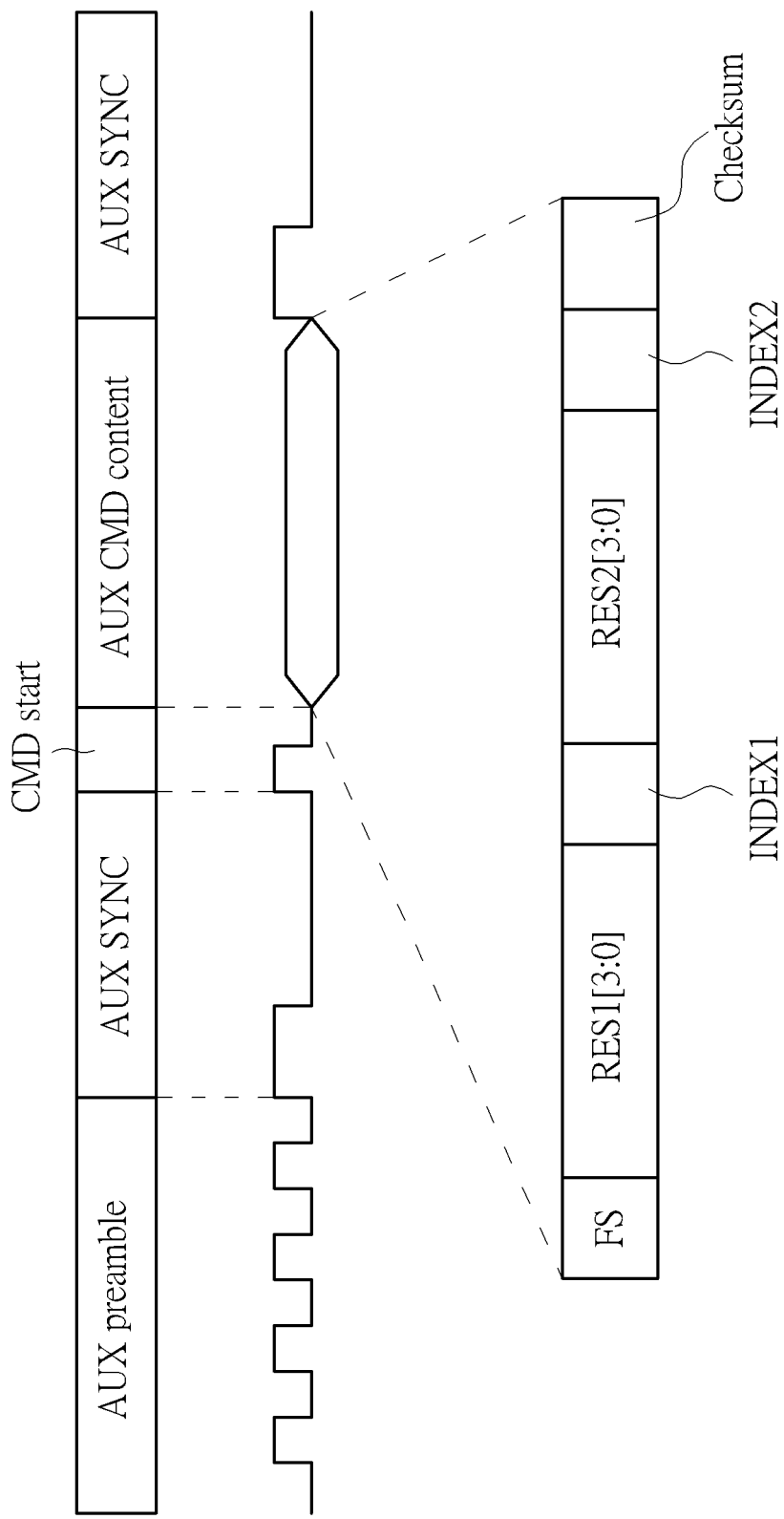
FIG. 3 is a diagram showing an example of the AUX communication signal AUX based on the auxiliary communication protocol of FIG. 1.

FIG. 3 is a diagram showing an example of the AUX communication signal AUX based on the auxiliary communication protocol of FIG. 1. As shown in FIG. 3, the auxiliary communication signal AUX for example comprises the AUX preamble, AUX synchronization (SYNC), command start, AUX command content, AUX SYNC, and so on. The data length of the AUX command content depends on the number of sub-systems. In this example, it is assumed that the auxiliary communication signal AUX is transmitted from the second system 101B to a third display sub-system. For example, the auxiliary communication signal AUX is generated from the last one slave of the set of second integrated source driver circuits 104B in the system 104B. The AUX command content sequentially comprises a frame start/synchronization bit 'FS', multiple resolution bits such as four bits REST [3:0], an system enable bit 'INDEX1', multiple resolution bits such as four bits RES2 [3:0], other reserved bits, an system enable bit 'INDEX2', and a corresponding checksum. This modification is not intended to be a limitation of the invention.

The timing controller of the last one in the set of cascaded integrated source driver circuits of the system 101A is arranged to generate and inset the frame start/synchronization bit 'FS' based on the vertical sync signal/information and then to generate and insert the four bits RES2 [3:0]) of display resolution information, and then to generate and insert the system enable bit 'INDEX2'. The timing controller of the last one in the set of cascaded integrated source driver circuits of the system 101B is arranged to generate and insert the four bits RES2[3:0] of display resolution information, and then to generate and insert the system enable bit 'INDEX2'. In addition, such timing controller also generates a corresponding checksum which follows the four bits RES2[3:0] or follows the other reserved bits.

The following table shows different examples of the four bits RES[3:0] of resolution information which can indicate different examples of different resolutions, different numbers of total horizontal lines, total chip(s) which is/are cascaded, and total channels per chip:

| | Resolution | | Integrated source driver circuit | |
|---|---|---|---|---|
| Settings RES [3:0] | RGB (x) | Line (Y) | Chips cascaded | Channels per chip |
| 0000 | 400 | 240 | 1 | 1200 |
| 0001 | 1920 | 720 | 4 | 1440 |
| 0010 | 1600 | 600 | 4 | 1200 |
| 0011 | 1440 | 540 | 3 | 1440 |
| 0100 | 1280 | 800 | 3 | 1284/1272/1284 |
| 0101 | 1280 | 480 | 3 | 1284/1272/1284 |
| 0110 | 1024 | 600 | 3 | 1020/1032/1020 |
| 0111 | 960 | 640 | 2 | 1440 |
| 1000 | 360 | 480 | 1 | 1080 |
| 1001 | 960 | 160 | 2 | 1440 |
| 1010 | 800 | 600 | 2 | 1200 |
| 1011 | 800 | 480 | 2 | 1200 |
| 1100 | 640 | 480 | 2 | 960 |
| 1101 | 320 | 120 | 1 | 960 |
| 1110 | 480 | 800 | 1 | 1440 |
| 1111 | 480 | 272 | 1 | 1440 |

The auxiliary communication protocol can support 16 kinds of resolutions, and the integrated source drivers can be cascaded to support a maximum resolution 1920×RGB×720 with four chips. However, this is not intended to be a limitation. The number of resolution bits can be configured to be different.

The system enable bit 'INDEX1' of the system 101A is used to indicate whether the system 101A is enabled or not. For example, if the system enable bit 'INDEX1' is equal to '1', then a next system which receives such system enable bit 'INDEX1' can know that the next system itself is not the first one system. Similarly, the system enable bit 'INDEX2' of the system 101B is used to indicate whether the system 101B is enabled or not. In addition, a display sub-system can know that the number of such display sub-system in all display sub-systems is equal to (N+1) if there were N-th system enable bits all being equal to '1' are received by the display sub-system.

Figure 4:
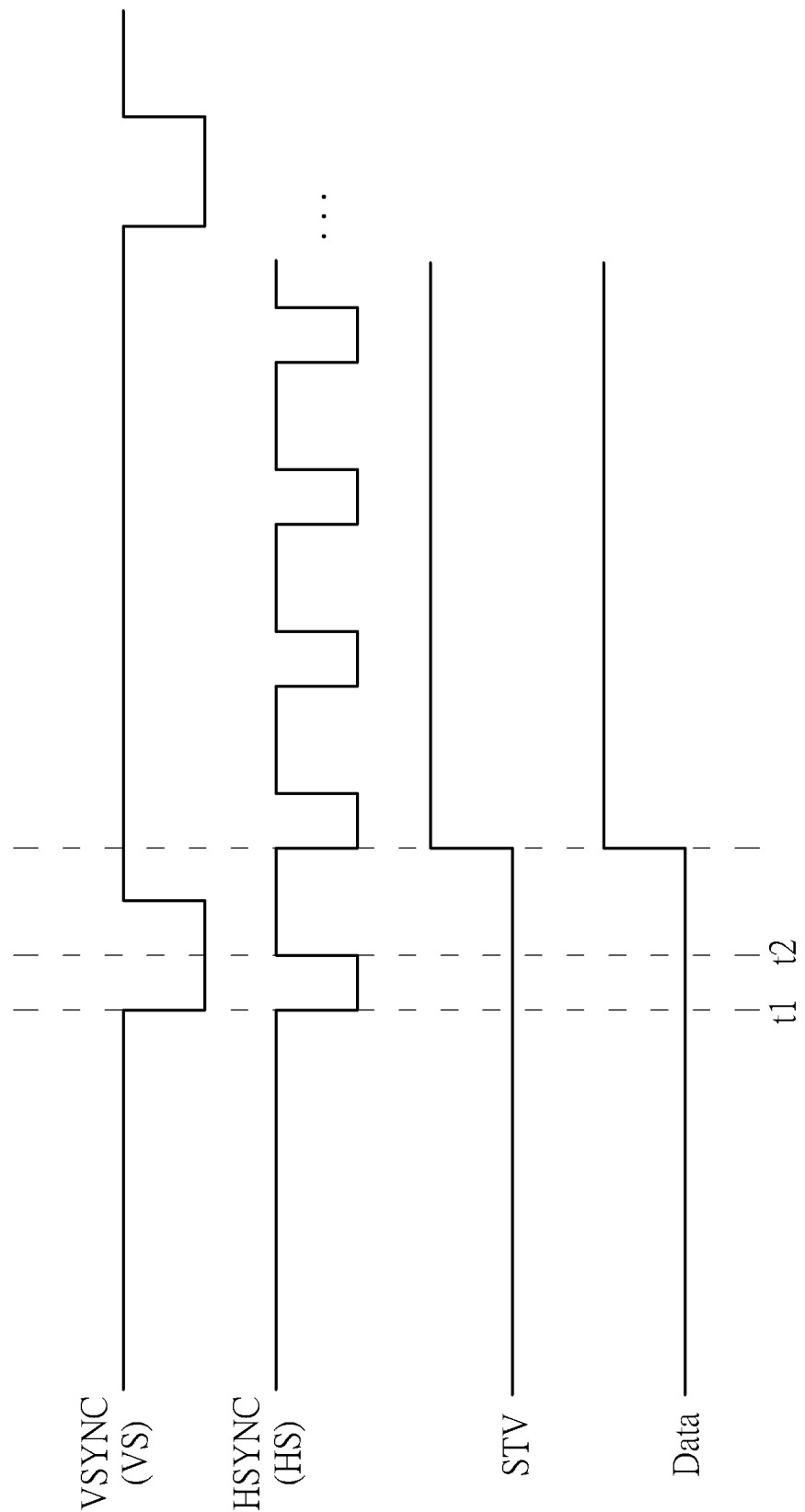
FIG. 4 is a diagram showing an example of using the AUX communication protocol to simultaneously generate STV signals to the different sets of gate driver circuits according to an embodiment of the invention.

FIG. 4 is a diagram showing an example of using the AUX communication protocol to simultaneously generate STV signals to the different sets of gate driver circuits according to an embodiment of the invention. As shown in FIG. 4, when receiving the vertical sync pulse signal VSYNC, the system 101A is triggered by the falling edge of the signal VSYNC to generate and fill the frame start/synchronization bit 'FS' into the AUX command content at time t1. The frame start/synchronization bit 'FS' is transmitted via the AUX communication protocol to the master of the set of integrated source driver circuits of the system 101B. The master of the set of integrated source driver circuits of the system 101B receives the frame start/synchronization bit 'FS' at time t2 before receiving any horizontal sync pulse signals. The masters among the set of cascaded integrated source driver circuits respectively in the systems 101A and 101B are designed to generate and send scan driver start pulse signals STV to the different sets of gate driver circuits respectively in the systems 101A and 101B when receiving a specific horizontal sync pulse signal HSYNC. For example, when receiving a first one of horizontal sync pulse signals HSYNC, the scan driver start pulse signals STV are simultaneously generated by timing controllers of the masters respectively among the different sets of cascaded integrated source driver circuits, and then are simultaneously transmitted to the different sets of gate driver circuits indifferent display sub-systems 101A and 101B respectively. Then, after receiving the scan driver start pulse signals STV simultaneously, the different sets of gate driver circuits in the different display sub-systems 101A and 101B are arranged to simultaneously output data to the different panels 102A and 102B respectively, shown by the switching of Data from the low logic level to the high logic level on FIG. 4.

Figure 5:
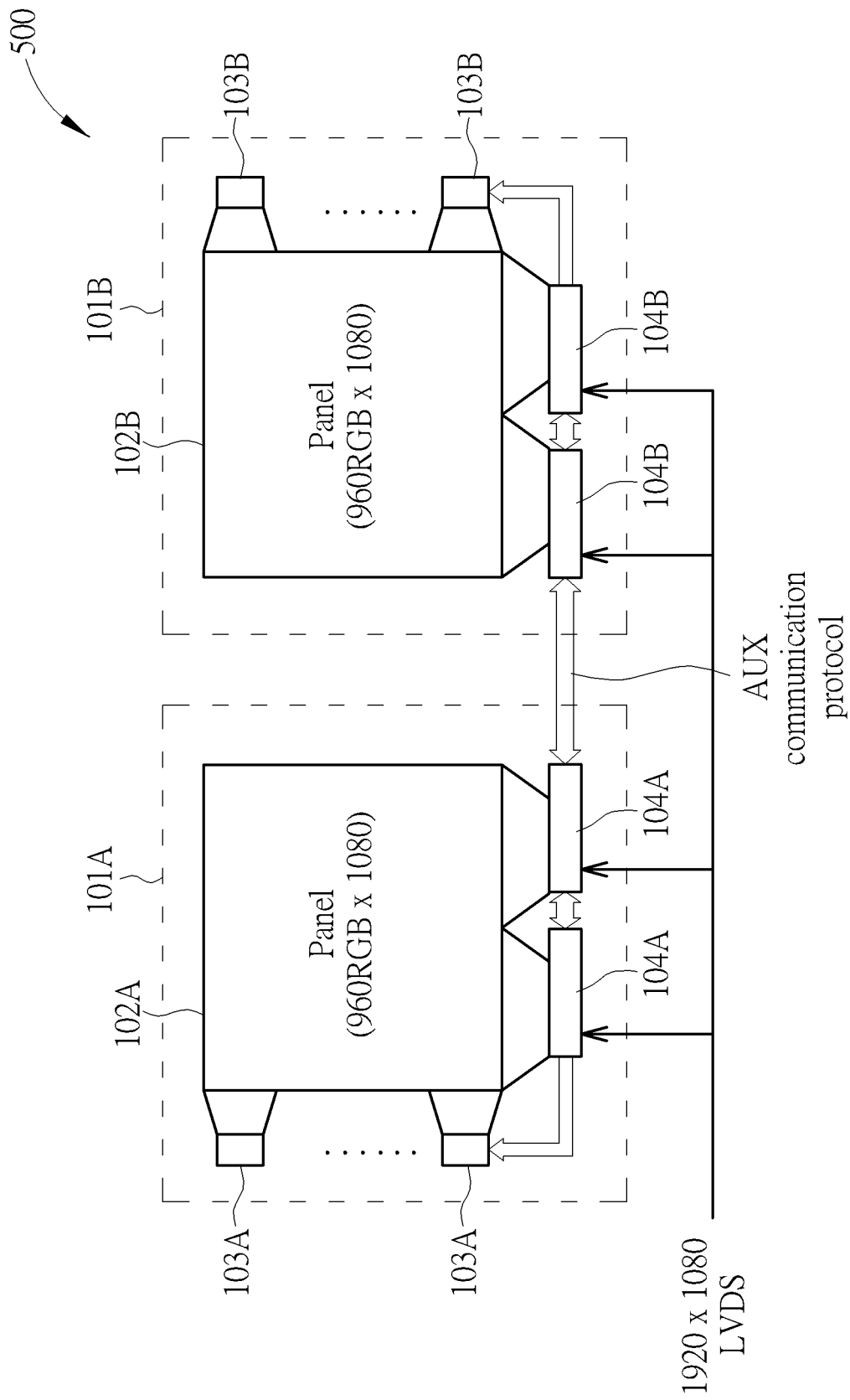
FIG. 5 is a diagram of a different display system with a different image resolution according to an embodiment of the invention.

In other embodiments, the image input signal may be different input signals with different image resolution; the panels are arranged to support different resolutions, and the number of cascaded integrated source driver circuits are different. FIG. 5 is a diagram of a different display system 500 with a different image resolution according to an embodiment of the invention. The LVDS signal is with 1920×1080 resolution. The panels 102A and 102B are respectively used to support the resolution of 960RGB×1080. The number of cascaded integrated source driver circuit in each display sub-system in this embodiment is configured as two. That is, one integrated source driver circuit in each display sub-system is the master, and the other integrated source driver circuit in the each display sub-system is the slave. The auxiliary communication protocol provided by the instant application can be also suitable for the display system 500.

Figure 6:
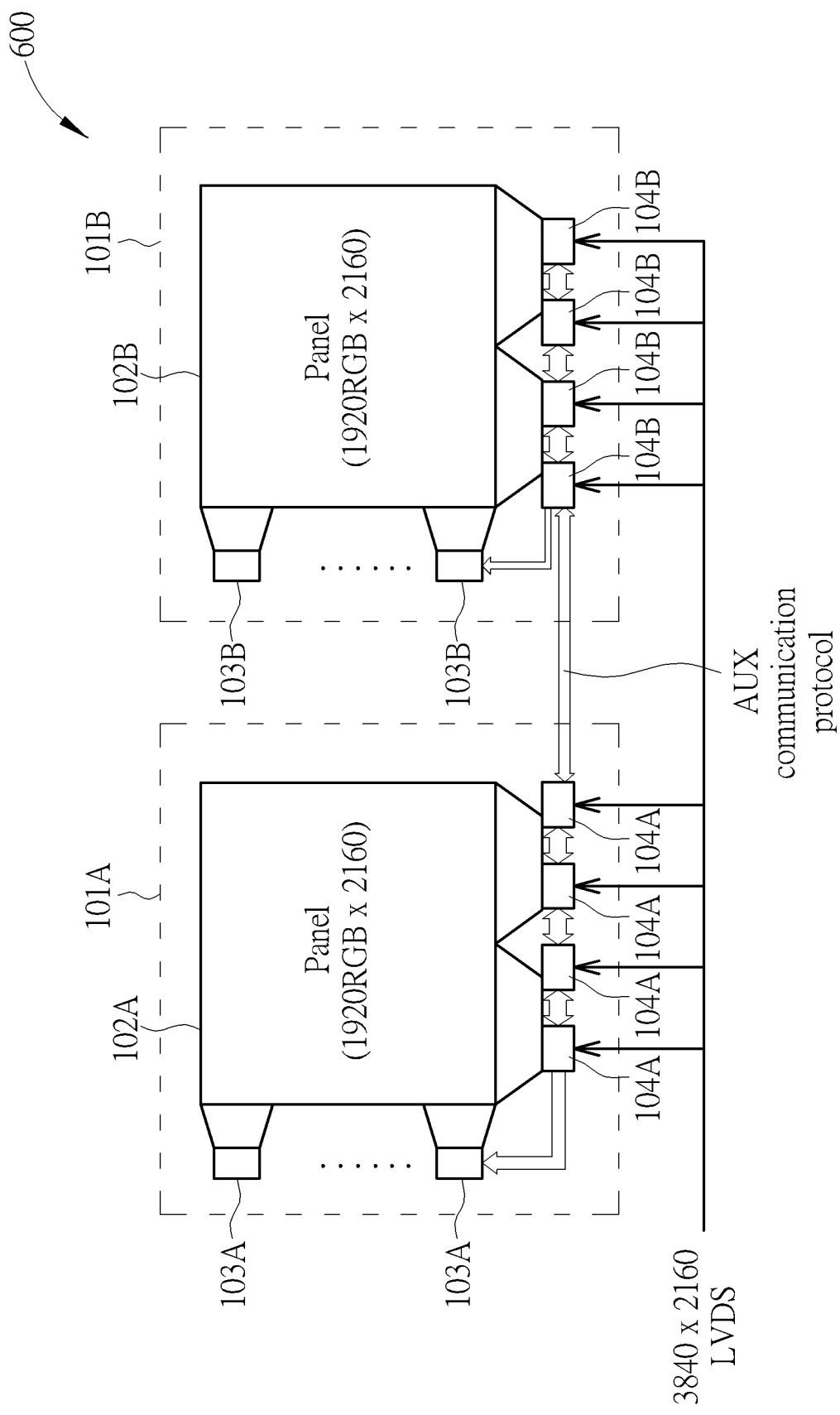
FIG. 6 is a diagram showing a different display system according to an embodiment of the invention.

Alternatively, in one embodiment, the arrangement of gate driver circuits in the system 101B can be changed. FIG. 6 is a diagram showing a different display system 600 according to an embodiment of the invention. In FIG. 6, the circuit displacement positions of the gate driver circuits 103B of the system 101B are changed, and the master of the set of cascaded integrated source driver circuits 104B of the system 101B is used to output the signals (e.g. the STV signal) to the gate driver circuits 103B. It should be noted that in FIG. 1 the last slave of the set of cascaded integrated source driver circuits 104B of the system 101B is used to output the signals (e.g. the STV signal) to the gate driver circuits 103B. This modification also obeys the spirit of the invention.

Figure 7:
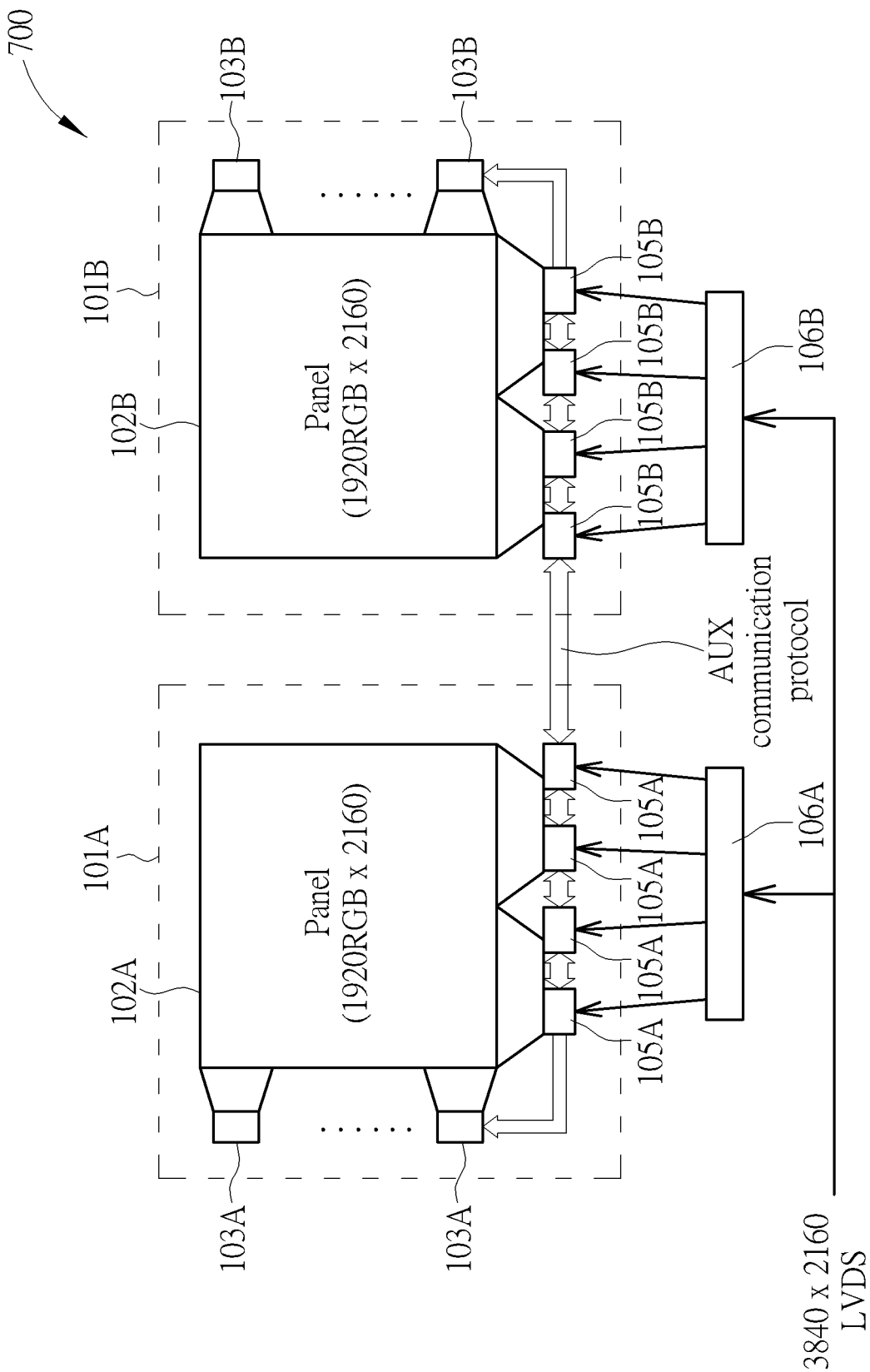
FIG. 7 is a block diagram of a display system according to an embodiment of the invention.

Alternatively, in one embodiment, a set of cascaded integrated source driver circuits in one or more display sub-systems can be replaced by a combination of a timing controller and a set of cascaded source drivers. For example, refer to FIG. 7. FIG. 7 is a block diagram of a display system 700 according to an embodiment of the invention. The display system 700 comprises at least two systems 101A and 101B wherein the two systems 101A and 101B are display sub-systems and are shown on FIG. 7 (but the number of sub-systems is not intended to be a limitation). Each display sub-system comprises a panel, a set of first gate driver circuits, a set of source drivers such as four cascaded integrated source drivers, and a timing controller. For example, the system 101A comprises the panel 102A, the set of gate driver circuits 103A, the set of cascaded source drivers 105A, and a timing controller 106A. The system 101B comprises the panel 102B, the set of gate driver circuits 103B, the set of cascaded source drivers 105B, and a timing controller 106B. The operations and functions of timing controllers 106A and 106B are similar to those of timing controller 205, and the operations and functions of source drivers 105A and 105B are similar to those of source driver 210; the detailed description is not described for brevity.

Further, in one embodiment, the auxiliary communication protocol can be used to transmit an unlock signal from a first sub-system to a second sub-system to notify the second sub-system of a black frame if the auxiliary communication protocol is not used to carry the auxiliary preamble and corresponding command contents, and then the second sub-system can know the black frame, so that the first and second sub-systems can simultaneously output the black frame to different panels.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display system, comprising:
   a first system, comprising:
      a first panel;
      a first set of gate driver circuits, coupled to the first panel; and
      a first set of integrated source driver circuits, coupled to the first panel and the first set of gate driver circuits; and
   a second system, comprising:
      a second panel;
      a second set of gate driver circuits, coupled to the second panel; and
      a second set of integrated source driver circuits, coupled to the second panel and the second set of gate driver circuits;
   wherein the first set of integrated source driver circuits are cascaded-connected; the second set of integrated source driver circuits are cascaded-connected; a last one in the first set of integrated source driver circuits is coupled to a first one of the second set of integrated source driver circuits via an auxiliary communication port based on an auxiliary communication protocol; an auxiliary communication signal which comprises a frame start, frame resolution information of the first system, and a system enable bit of the first system is transmitted to the second system via the auxiliary communication port to synchronize an image display operation of the first system with an image display operation of the second system.

2. The display system of claim 1, wherein the auxiliary communication port has a single signal pin; the frame start, the frame resolution information of the first system, and the system enable bit of the first system are transmitted from the last one of the first set of integrated source driver circuits to the master of the second set of integrated source driver circuits through the single signal pin.

3. The display system of claim 2, wherein the frame start is generated by the last one of the first set of integrated source driver circuits.

4. The display system of claim 1, wherein an integrated source driver circuit in the first set of integrated source driver circuits comprises:
   an input signal port;
   an output signal port;
   a control signal port;
   a cascade signal port;
   an auxiliary port;
   a timing controller;
   a source driver, coupled to the input signal port, the output signal port, and the timing controller, to be controlled by the timing controller and used for receiving a frame input signal to generate an image output signal to the first panel;
a cascade control circuit, coupled to the timing controller and the cascade signal port, for transmitting and receiving cascade communication signals between the timing controller and a different integrated source driver circuit via the cascade signal port; and
an auxiliary control circuit, coupled to the timing controller and the auxiliary port, capable of transmitting and receiving the auxiliary communication signal between the timing controller and the different integrated source driver circuit.

5. The display system of claim 4, wherein and the auxiliary control circuit is arranged to transmit the auxiliary communication signal from the timing controller to the different integrated source driver circuit when the integrated source driver circuit is the last one of the first set of integrated source driver circuits.

6. The display system of claim 5, wherein the frame input signal comprises a vertical synchronization signal, a horizontal synchronization signal, and multiple data input signals; the timing controller is arranged to generate the frame start based on the vertical synchronization signal, to generate the frame resolution information based on the multiple data input signals, and to generate the system enable bit.

7. The display system of claim 1, wherein a first master integrated source driver circuit in the first set of integrated source driver circuits and a second master integrated source driver circuit in the second set of integrated source driver circuits are arranged to generate a first scan driver start pulse signal and a second scan driver start pulse signal respectively to the first set of gate driver circuits and the second set of gate driver circuits when the first master integrated source driver circuit and the second master integrated source driver circuit receive a specific horizontal synchronization signal after the frame start is received.

8. The display system of claim 1, wherein the auxiliary communication port is used to transmit an unlock signal from the first system to the second system to notify the second system of a black frame if the auxiliary communication protocol is not used.

9. An integrated source driver circuit to be used in a first set of integrated source driver circuits in a first system in a display system, the display system comprising the first system and a second system, the first system comprising a first panel, a first set of gate driver circuits, and the first set of integrated source driver circuits, the second system comprising a second panel, a second set of gate driver circuits, and a second set of integrated source driver circuits, the first set of integrated source driver circuits to be cascaded-connected, the second set of integrated source driver circuits to be cascaded-connected, and the integrated source driver circuit comprises:
an input signal port;
an output signal port;
a control signal port;
a cascade signal port;
an auxiliary port;
a timing controller;
a source driver, coupled to the input signal port, the output signal port, and the timing controller, to be controlled by the timing controller and used for receiving a frame input signal to generate an image output signal to the first panel;
a cascade control circuit, coupled to the timing controller and the cascade signal port, for transmitting and receiving cascade communication signals between the timing controller and a different integrated source driver circuit via the cascade signal port; and
an auxiliary control circuit, coupled to the timing controller and the auxiliary port, capable of transmitting and receiving an auxiliary communication signal between the timing controller and the different integrated source driver circuit;
wherein a last one in the first set of integrated source driver circuits to be coupled to a first one of the second set of integrated source driver circuits via an auxiliary communication port based on an auxiliary communication protocol; the auxiliary communication signal which comprises at least one of frame start, frame resolution information of the first system, and a system enable bit of the first system is transmitted to the second system via the auxiliary communication port to synchronize an image display operation of the first system with an image display operation of the second system.

10. The integrated source driver circuit of claim 9, wherein and the auxiliary control circuit is arranged to transmit the auxiliary communication signal from the timing controller to the different integrated source driver circuit when the integrated source driver circuit is the last one of the first set of integrated source driver circuits.

11. The integrated source driver circuit of claim 10, wherein the frame input signal comprises a vertical synchronization signal, a horizontal synchronization signal, and multiple data input signals; the timing controller is arranged to generate the frame start based on the vertical synchronization signal, to generate the frame resolution information based on the multiple data input signals, and to generate the system enable bit.

12. A display system, comprising:
a first system, comprising:
a first panel;
a first set of gate driver circuits, coupled to the first panel; and
a first set of integrated source driver circuits, coupled to the first panel and the first set of gate driver circuits; and
a second system, comprising:
a second panel;
a second set of gate driver circuits, coupled to the second panel; and
a second set of integrated source driver circuits, coupled to the second panel and the second set of gate driver circuits;
wherein the first set of integrated source driver circuits are cascaded-connected; the second set of integrated source driver circuits are cascaded-connected; a last one in the first set of integrated source driver circuits is coupled to a first one of the second set of integrated source driver circuits via an auxiliary communication port based on an auxiliary communication protocol which is used to send an auxiliary communication signal comprising a frame start to synchronize an image display operation of the first system with an image display operation of the second system; a first master integrated source driver circuit in the first set of integrated source driver circuits and a second master integrated source driver circuit in the second set of integrated source driver circuits are arranged to generate a first scan driver start pulse signal and a second scan driver start pulse signal respectively to the first set of gate driver circuits and the second set of gate driver circuits when the first master integrated source driver circuit and the second master integrated source driver circuit receive a specific horizontal synchronization signal after the frame start is received.

\* \* \* \* \*